No. 835,307. PATENTED NOV. 6, 1906.
J. M. MATTHEWS.
MANUFACTURE OF CARBON TETRACHLORID.
APPLICATION FILED JAN. 26, 1904.
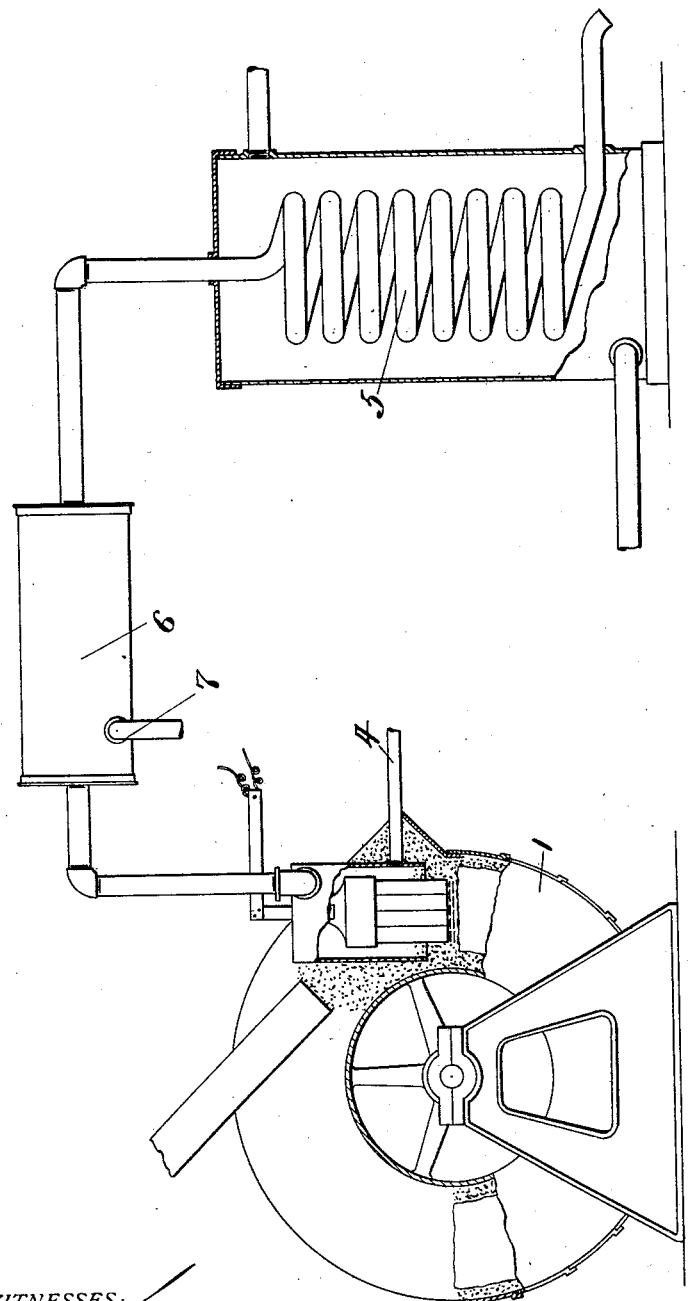
WITNESSES:
INVENTOR.
Joseph Merritt Matthews.
BY
Augustus B. Stoughton
ATTORNEY.

UNITED STATES PATENT OFFICE.

JOSEPH MERRITT MATTHEWS, OF PHILADELPHIA, PENNSYLVANIA, ASSIGNOR TO FREDERICK DARLINGTON, OF GREAT BARRINGTON, MASSACHUSETTS.

MANUFACTURE OF CARBON TETRACHLORID.

No. 835,307. Specification of Letters Patent. Patented Nov. 6, 1906.

Application filed January 26, 1904. Serial No. 190,712.

*To all whom it may concern:*

Be it known that I, JOSEPH MERRITT MATTHEWS, a citizen of the United States, residing at Philadelphia, in the county of Philadelphia and State of Pennsylvania, have invented certain new and useful Improvements in the Manufacture of Carbon Tetrachlorid, of which the following is a specification.

In the operation of my process I use calcium chlorid or the chlorid of other alkali-earth metals in admixture with carbon and subject the mixture to the heat of the electric furnace, whereby the carbon reacts with the calcium chlorid, forming carbon tetrachlorid and calcium carbid, the former compound being conducted through cooled condensers, whereby it is condensed to the liquid form. In order that the reaction may proceed in a proper manner without oxidation or further decomposition of the main products into secondary compounds, the reaction in the electric furnace between the carbon and the calcium chlorid should take place in an atmosphere which is free from any oxidizing or decomposing influence. Furthermore, in order that the best yield of carbon tetrachlorid be obtained free from other chlorin compounds of carbon, such as hexachlor-ethane $C_2Cl_6$ and tetrachlor-ethylene $C_2Cl_4$, the condensation of the highly-heated vapors may take place in an atmosphere of chlorin gas.

The carbon tetrachlorid, the formation of which is the purpose of this invention, is a liquid of great value as a solvent for all manner of greases, oils, fats, and waxes. Furthermore, it not only has a great solvent action on such substances, but, differing from the other commonly-employed solvents—such as ether, benzene, benzol, naphtha, and other volatile solvents—it is neither inflammable in itself nor explosive when its vapors are mixed with air nor has it the anesthetic properties of chloroform, also used as a solvent.

The valuable qualities of carbon tetrachlorid as a solvent have long been recognized; but owing to the high cost of its manufacture it has not hitherto been available for use as such except to a very limited degree. By the use of the process above outlined for the manufacture of this substance it may be produced on a commercial scale and at a cost sufficiently low to permit of it coming into wide use as a volatile solvent of a non-inflammable and non-explosive character.

The calcium chlorid employed as one of the constituent raw materials for the preparation of carbon tetrachlorid by this process is a cheap and plentiful substance, being obtained as a by-product in a number of chemical manufactures and for which but little use has hitherto been devised. The carbon employed may best be in the form of coke, though other forms of carbon may be used without interfering with the essential features of the process.

In the accompanying drawing there is illustrated, principally in central section, one form of apparatus adapted for use in the practice of the invention.

The apparatus to be employed for the carrying out of this process may be a suitably-constructed electric furnace 1, such as ordinarily employed in the electrochemical industries. It must, however, be provided with a closed flue for the purpose of carrying off the vapors of the carbon tetrachlorid into the condensers and may also be provided with an inlet-pipe 4 for the introduction of a current of non-oxidizing gas. The condensers may be of the usual form of such apparatus, consisting of a coil of iron or lead pipe or other material 5, surrounded by a current of cold water for the purpose of cooling the heated gases within the pipes that these gases may be condensed to the form of a liquid. Between the electric furnace and the condenser there should be provided a chamber 6 for the purpose of condensing other volatile compounds that may be carried over from the furnace by reason of the great heat and violent chemical action. Into this chamber there should also be conducted, as by a conduit 7, a current of chlorin gas.

The chemical reactions taking place in the electric furnace between calcium chlorid and carbon may be represented in the following manner: $2CaCl_2 + 5C = CCl_4 + 2C_2Ca$. The theory of this chemical representation of the reaction has been deduced from a consideration of the heats of formation of the reacting substances and of the compounds produced and by a comparison of the results so obtained with those known to hold in the heating of a mixture of lime and carbon in the electric furnace, as in the well-known method for the preparation of calcium carbid. The latter reaction takes place as follows: $CaO + 3C = C_2Ca + CO$.

It will be obvious to those skilled in the art to which my invention relates that modifications may be made in details without departing from the spirit thereof. Hence I do not limit myself to the precise arrangement of parts hereinabove set forth; but,

Having thus described the nature and objects of my invention, what I claim as new, and desire to secure by Letters Patent, is—

1. The process of producing carbon tetrachlorids, which consists in preparing an admixture of calcium chlorid and carbon adapted to react and form calcium carbid and chlorin compounds of carbon, and subjecting the admixture to heat sufficient to effect the reaction indicated, substantially as described.

2. The process of producing chlorin compounds of carbon which consists in preparing a mixture of calcium chlorid and carbon adapted to react and form calcium carbid and chlorin compounds of carbon, and subjecting the mixture to heat sufficient for effecting the reaction mentioned, substantially as described.

3. The process of producing chlorin compounds of carbon which consists in preparing a mixture of the chlorids of the alkaline-earth metals and carbon, and subjecting the mixture to a heat sufficient to form carbids and chlorin compounds of carbon, substantially as described.

4. The process of producing carbon tetrachlorid which consists in preparing an admixture of calcium chlorid and carbon adapted to react and form calcium carbid and chlorin compounds of carbon, and subjecting the mixture to the heat of an electric current of sufficient energy to effect the reaction indicated.

5. The process of producing chlorin compounds of carbon which consists in preparing a mixture of calcium chlorid and carbon adapted to react and form calcium carbid and chlorin compounds of carbon, and subjecting the mixture to the heat of the electric current of sufficient energy for effecting the reaction mentioned.

6. The process of producing chlorin compounds of carbon which consists in preparing a mixture of the chlorids of the alkaline-earth metals and carbon, and subjecting the mixture to the heat of the electric current of sufficient energy for effecting the reaction mentioned.

7. The process of producing chlorin compounds of carbon which consists in preparing a mixture of calcium chlorid and carbon adapted to react and form calcium carbid and chlorin compounds of carbon, and subjecting the same to sufficient heat for causing the reaction indicated in the presence of a non-oxidizing gas, substantially as described.

8. The process of producing carbon tetrachlorid which consists in causing calcium chlorid to react with carbon under the influence of high heat thereby forming calcium carbid and chlorin compound of carbon, and subjecting the chlorin compounds of carbon to chlorin gas to produce carbon tetrachlorid substantially as described.

9. The process of producing chlorin compounds of carbon which consists in heating a mixture of the chlorids of the alkaline-earth metals and carbon in a non-oxidizing atmosphere thus forming chlorin compounds of carbon and carbids, and subjecting the chlorin compounds of carbon to the reaction with chlorin to produce carbon tetrachlorid, substantially as described.

10. The process of producing chlorids of carbon, which consists in heating to a high temperature a mixture of an alkaline-earth-metal chlorid and carbon.

11. The process of producing chlorids of carbon, which consists in electrically heating a mixture of an alkaline-earth-metal chlorid and carbon.

In witness whereof I have hereunto signed my name.

JOSEPH MERRITT MATTHEWS.

Witnesses:
   WM. A. COX,
   K. M. GILLIGAN.